US011714543B2

(12) United States Patent
Morris et al.

(10) Patent No.: US 11,714,543 B2
(45) Date of Patent: Aug. 1, 2023

(54) SIMULTANEOUS GESTURE AND TOUCH CONTROL ON A DISPLAY

(71) Applicant: T1V, INC., Charlotte, NC (US)

(72) Inventors: James E. Morris, Lake Wylie, SC (US); Michael R. Feldman, Charlotte, NC (US); Ron Gilson, Cornelius, NC (US)

(73) Assignee: T1V, INC., Charlotte, NC (US)

( * ) Notice: Subject to any disclaimer, the term of this patent is extended or adjusted under 35 U.S.C. 154(b) by 0 days.

(21) Appl. No.: 16/589,648

(22) Filed: Oct. 1, 2019

(65) Prior Publication Data

US 2020/0104040 A1    Apr. 2, 2020

Related U.S. Application Data

(60) Provisional application No. 62/739,619, filed on Oct. 1, 2018.

(51) Int. Cl.
| | | |
|---|---|---|
| *G06F 3/04883* | (2022.01) | |
| *G06F 3/0481* | (2022.01) | |
| *H04N 7/15* | (2006.01) | |
| *G06F 3/01* | (2006.01) | |

(52) U.S. Cl.
CPC ........ *G06F 3/04883* (2013.01); *G06F 3/0481* (2013.01); *G06F 3/017* (2013.01); *G06F 2203/04808* (2013.01); *H04N 7/15* (2013.01)

(58) Field of Classification Search
CPC ............... G06F 3/04883; G06F 3/0481; G06F 2203/04808; G06F 2203/0381; G06F 3/0488; G06F 3/017; H04N 7/15; H04N 7/147

See application file for complete search history.

(56) References Cited

U.S. PATENT DOCUMENTS

| | | | | |
|---|---|---|---|---|
| 5,594,469 A | * | 1/1997 | Freeman ................. | G06F 3/017 345/158 |
| 2011/0083106 A1 | * | 4/2011 | Hamagishi .......... | G06F 3/04815 715/836 |
| 2012/0137253 A1 | * | 5/2012 | Eom .................... | G06F 3/04883 715/835 |
| 2012/0163661 A1 | * | 6/2012 | Lee ..................... | G06K 9/00342 382/103 |

(Continued)

*Primary Examiner* — Michael Roswell
(74) *Attorney, Agent, or Firm* — Xsensus LLP

(57) ABSTRACT

A method of controlling contents displayed on a display includes processing inputs from different users across multiple application windows of one or more applications displayed on a single display of a user interface, resulting in a multi-user graphical user interface (GUI), the computing environment running an operating system (OS), the computing environment having a multiple input detection system to respond to user inputs from different users simultaneously, the multiple input detection system including a touch screen on the single display that detects touch inputs and a contactless gesture sensor that detects contactless gestures. When a user input is detected by the touch detector, the GUI displays a first input interface to be used with touch. When a user input is detected by the contactless gesture sensor, the GUI displays a second input interface to be used with gestures, the second input interface being different from the first input interface.

21 Claims, 15 Drawing Sheets

(56) References Cited

U.S. PATENT DOCUMENTS

| | | | |
|---|---|---|---|
| 2012/0257035 A1* | 10/2012 | Larsen | G06F 3/017 348/78 |
| 2012/0278729 A1* | 11/2012 | Vennelakanti | G06F 3/0481 715/750 |
| 2013/0069860 A1* | 3/2013 | Davidson | G06F 3/04886 345/156 |
| 2013/0318445 A1* | 11/2013 | Mitchell | G06F 3/0488 715/744 |
| 2015/0200985 A1* | 7/2015 | Feldman | H04L 67/12 715/753 |
| 2019/0056840 A1* | 2/2019 | Mamaril | G06F 3/0482 |

* cited by examiner

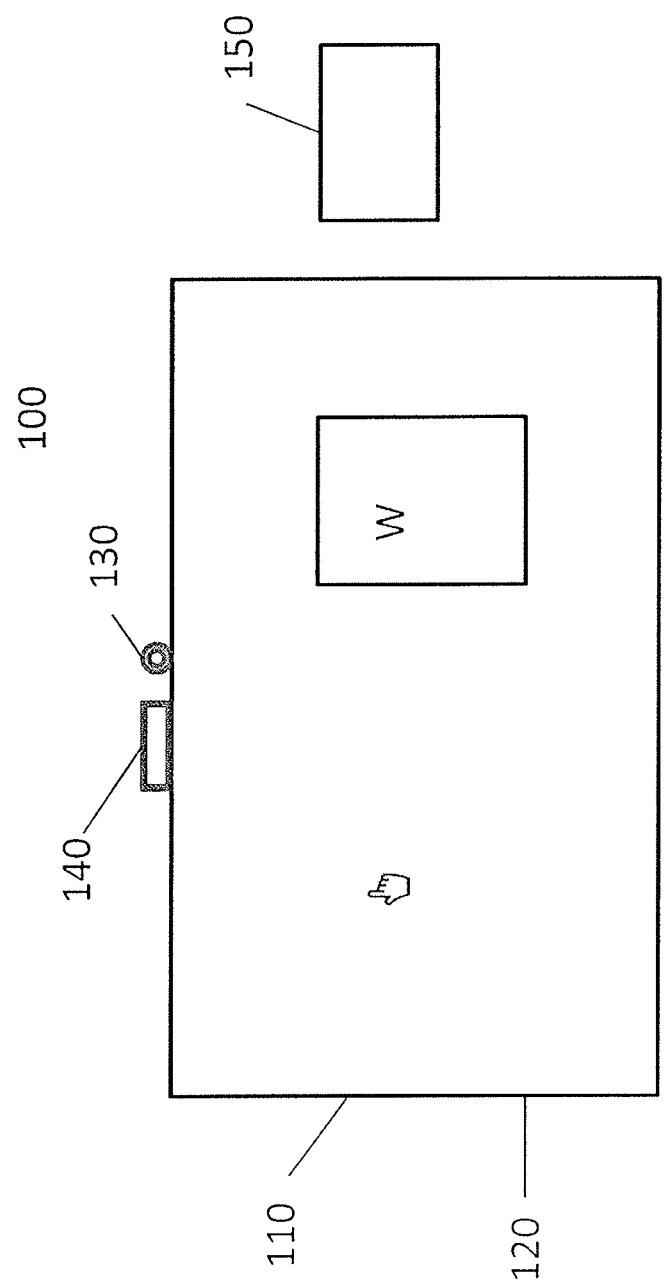

SIMULTANEOUS GESTURE AND TOUCH CONTROL ON A DISPLAY

CROSS-REFERENCE TO RELATED APPLICATION

The present application claims priority under 35 U.S.C. § 119(e) to U.S. Provisional Application No. 62/739,619, filed on Oct. 1, 2018, and entitled: "Simultaneous Gesture and Touch Control on a Display," which is incorporated herein by reference in its entirety.

DESCRIPTION OF RELATED ART

There are currently different solutions to using gestures to control a display remotely and different solutions to using touch control on a display when in contact with the display. Gesture solutions include sensing gestures using a wearable device and using complex trajectory information. However, using both types of inputs simultaneously has not been realized.

SUMMARY

In a computing environment, a method for processing inputs from different users across multiple application windows of one or more applications displayed on a single display of a user interface, resulting in a multi-user graphical user interface (GUI), the computing environment running an operating system (OS), the computing environment having a multiple input detection system to respond to user inputs from different users at a same time, the multiple input detection system including a touch screen on the single display that detects touch inputs and a contactless gesture sensor that detects contactless gestures, the method including receiving a first user input from the touch screen; simultaneous to receiving the first user input from the touch screen, receiving a different second user input from the contactless gesture sensor; determining, in a primary application, separate from the OS, that the first user input corresponds to a first window; the primary application sending the first user input to a first secondary application that runs in parallel with the primary application, the first secondary application being designed to run with the OS; determining a first user input event from the first user input; displaying a result of the determined first user input event in the first window associated with the first secondary application; determining, in the primary application, that a second user input corresponds to a second window; the primary application sending the second user input to a second secondary application that runs in parallel with the primary application, the second secondary application being designed to run with the OS; determining a second user input event from the second user input; and displaying a result of the determined second user input event on the second window associated with the second secondary application.

In a computing environment, a method of controlling contents displayed on a display, method for processing inputs from different users across multiple application windows of one or more applications displayed on a single display of a user interface, resulting in a multi-user graphical user interface (GUI), the computing environment running an operating system (OS), the computing environment having a multiple input detection system to respond to user inputs from different users at a same time, the multiple input detection system including a touch screen on the single display that detects touch inputs and a contactless gesture sensor that detects contactless gestures, the method including when a user input is detected by the touch screen, the GUI displays a first input interface to be used with touch; and when a user input is detected by the contactless gesture sensor, the GUI displays a second input interface to be used with gestures, the second input interface being different from the first input interface.

The first input interface may be in a periphery of a selected window and the second input interface overlaps a selected window.

The second input interface may include at least two buttons.

An area of the second input interface outside the at least two buttons may have a default operation.

The second input interface may include another input interface outside of the selected window.

The second input interface may include a mode selection.

The first input interface may include a first set of operations and the second input interface includes a second set of operations, different from the first set of operations.

The second set of operations may have fewer operations than the first set of operations.

The second set of operations may be a subset of the first set of operations.

The second set of operations may include an operation not in the first set of operations.

When an open hand gesture is sensed, an icon is displayed on the display, and moving an open hand over the icon may move the icon on the display in accordance with the movement of the open hand and a closed hand over the icon may move a virtual canvas on the display in accordance with the movement of the closed hand.

When a closed hand gesture is sensed, a window overlapped by the closed hand may be selected.

When an open hand gesture is sensed on a window, buttons corresponding to the second input interface may be displayed on the window overlapped by the open hand.

When a closed hand gesture is sensed on a button, the operations of the second input interface that button corresponds to may be executed.

The contactless gesture sensor may include a camera separate from a video-conferencing camera associated with the display.

The OS may be designed to run with a single user GUI.

BRIEF DESCRIPTION OF THE DRAWINGS

Features will become apparent to those of skill in the art by describing in detail exemplary embodiments with reference to the attached drawings in which:

FIG. 1 illustrates a block diagram of a display system in accordance with embodiments;

DETAILED DESCRIPTION

Figure 2C:
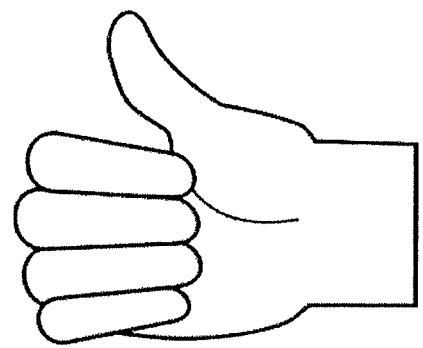
FIGS. 2A to 2C illustrate types of hand gestures to be sensed.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

U.S. Pat. No. 9,596,319, incorporated by reference herein in its entirety for all purposes, generally discloses how to handle multiple user inputs that occur simultaneously. As disclosed therein, all inputs are assumed to function in a same fashion. As disclosed therein, a virtual canvas ("Canvas") is a virtual region that expands to greater than the physical area of a display region of a display, e.g., any number of times the physical area up to infinite. The use of the Canvas allows additional files to be accessible and can be saved, but off the display region. Gestures, such as pan, zoom and pinch gestures can be made to move and resize the scale of the Canvas, allowing the full canvas to be display at once or only a small section thereof. As disclosed therein, all inputs are assumed to function in a same fashion, i.e., allow all of the same operations to be performed, even when an operating system (OS) is designed to operate with a single graphical user interface (GUI). However, this may not be practical when using a remote, e.g., non-contact, contactless, or touchless, gesture as an input.

First, FIG. 1 will provide a brief overview of a system 100 including a display 110 having a touch sensor 120, e.g., overlaying an entirety of the display 110, that it is sensitive to touch inputs including taps and gestures, a camera 130 associated with the display 110, e.g., for video conferencing, and a gesture sensor 140 to detect remote gestures, i.e., non contact or touchless inputs. The system also includes a display computer 150 connected to all components. The display computer may include an operating system (OS), a graphic processing unit (GPU), a primary application (PA), other applications, e.g., a web browser application (WBA), Power Point, designed to operate with a single or multiple user graphical user interface (GUI), and so forth, a touchscreen (TS) driver, and a gesture sensor (GS) driver.

One or more windows W may be open on the display. The window may be a file, e.g., a video file, a word document, and so forth, a web browser, a streaming video of another display, e.g., a mobile display or a remote display, and so forth.

Figure 2B:

To perform gesture sensing simultaneously while using direct touch inputs, when a user waves their hand or raises an open hand for a predetermined time, a hand cursor 160 may appear on the display 110. The gesture sensor 140 may sense a limited set of hand gestures, e.g., those shown in FIGS. 2A to 2C, examples of the effects of which will be described in detail below. For example, the set of hand gestures may include an open hand, shown in FIG. 2A, a first or closed hand, shown in FIG. 2B, and a one-hand clap, shown in FIG. 2C. Other users may still user other inputs to control windows on the display 110 screen, e.g., using a mouse and/or direct multi-touch.

Figure 2A:
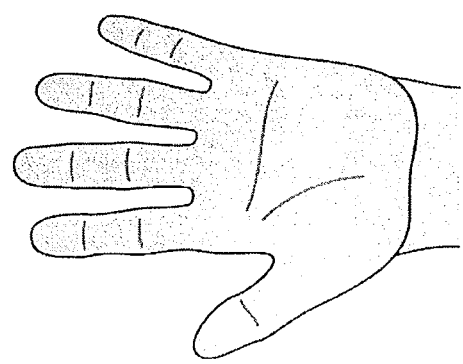
Figure 3:
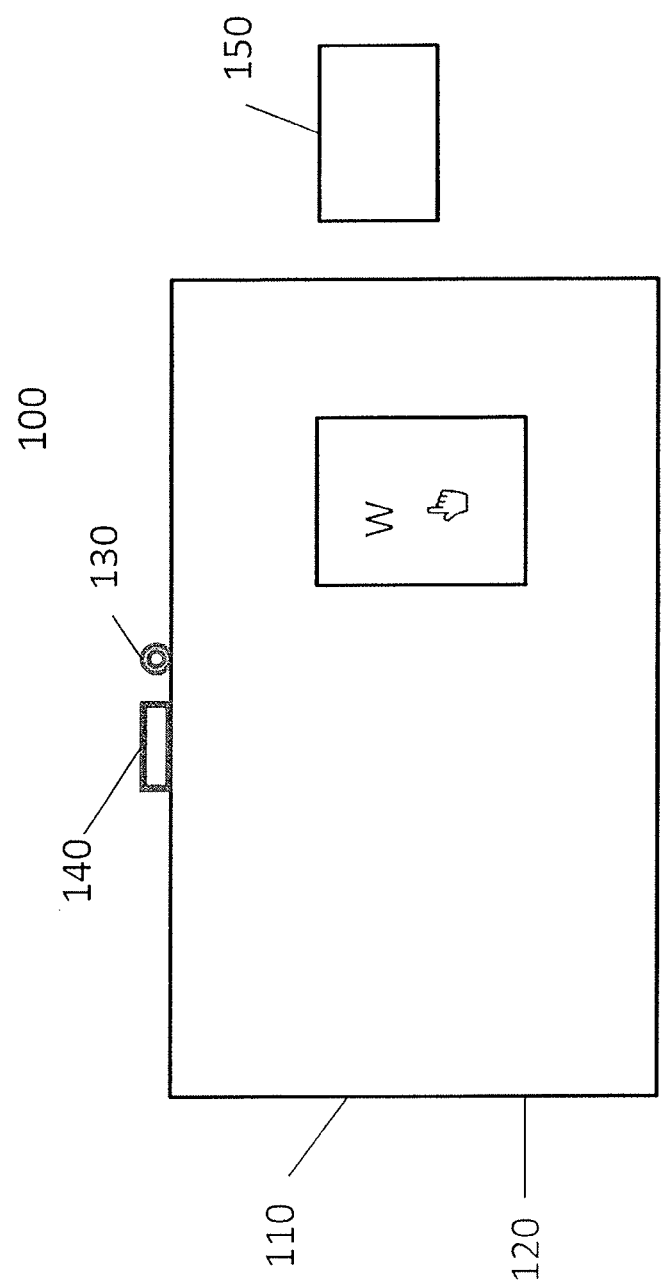
FIGS. 3 to 13 illustrate different actions in response to gestures in accordance with embodiments.
Figure 4:
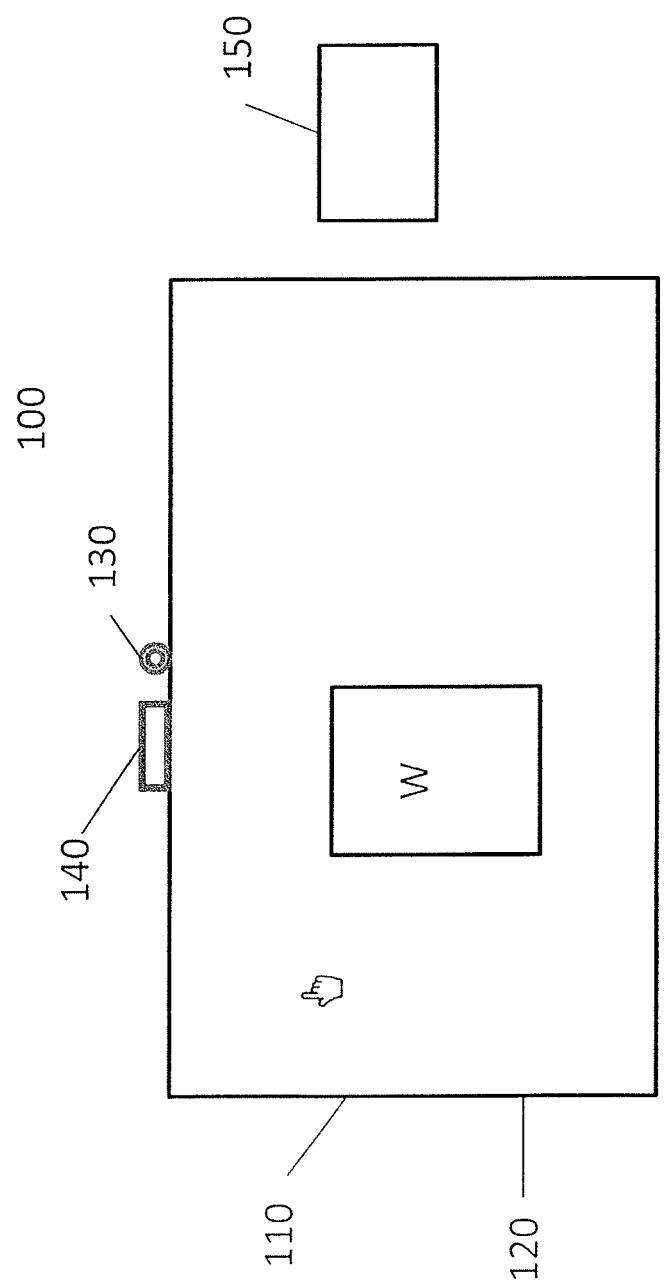

When the hand cursor is not over a particular window, as shown in FIG. 1, an open hand of FIG. 2A will move the hand cursor around the display 110, e.g., such that it may overlap a window as shown in FIG. 3. When the hand cursor is not over a particular window, as shown in FIG. 1, a first of FIG. 2B will move the entirety of the canvas on which the window is placed. For example, when the gesture sensor 140 senses a first moving to the left, the entirety of the canvas may be shifted to the left, as illustrated in FIG. 4.

Figure 5:
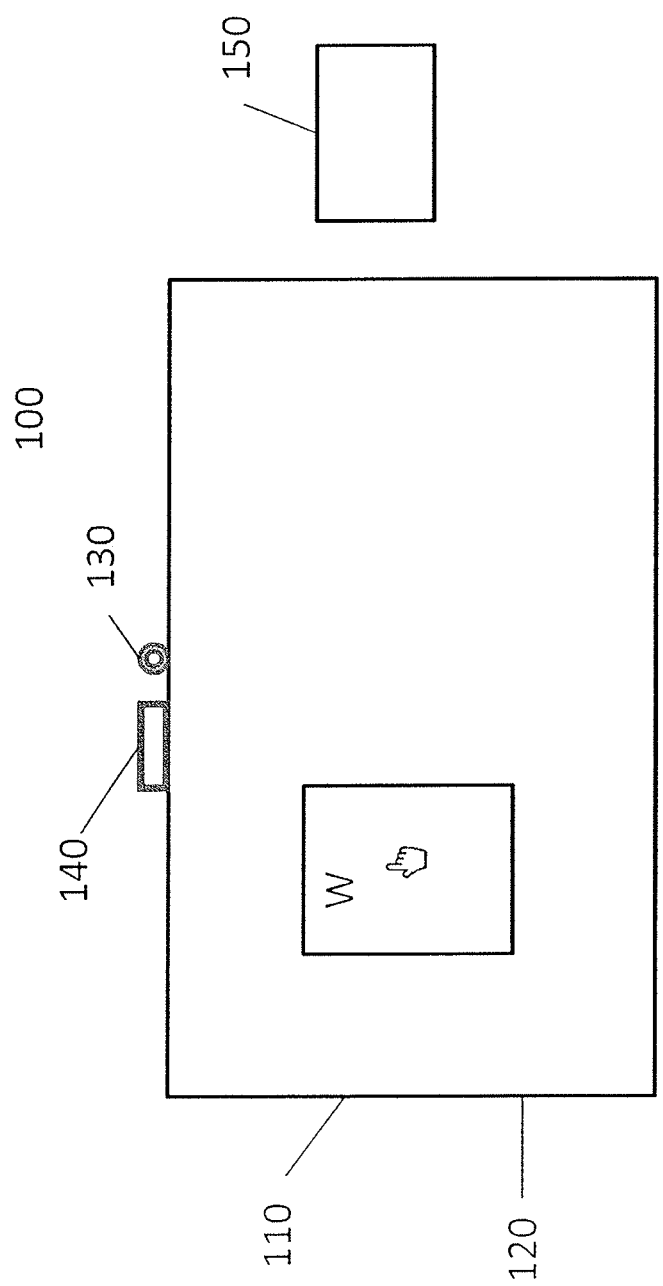
Figure 6:
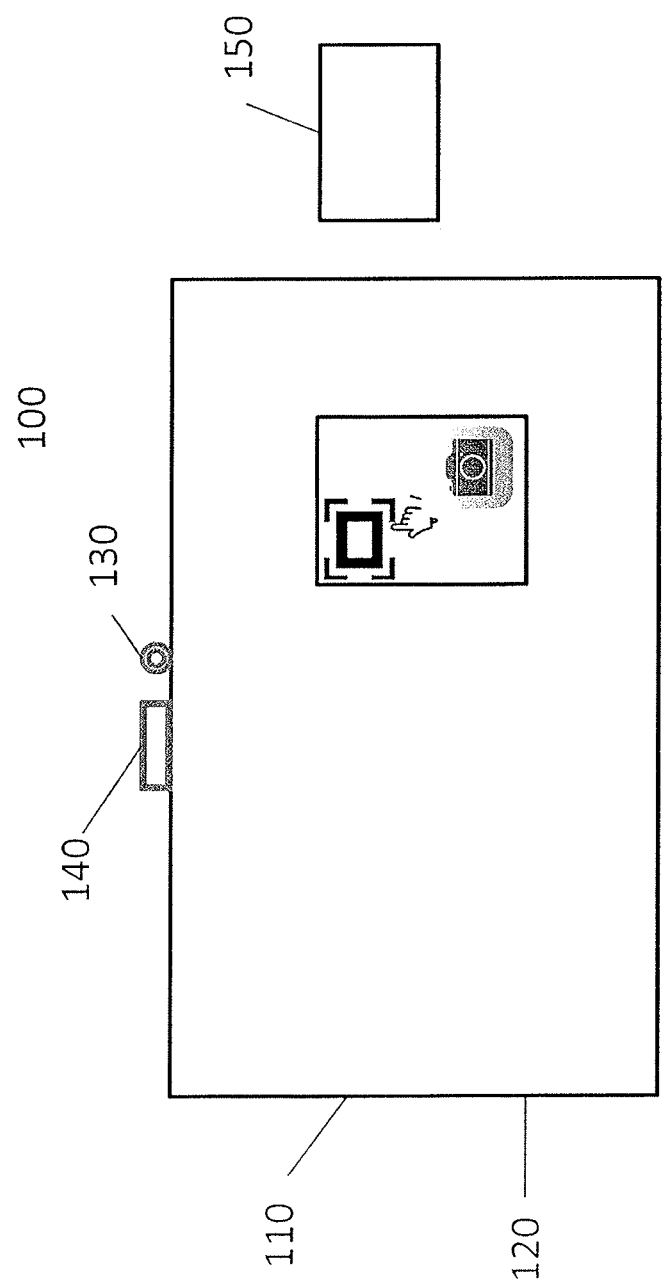
Figure 7:
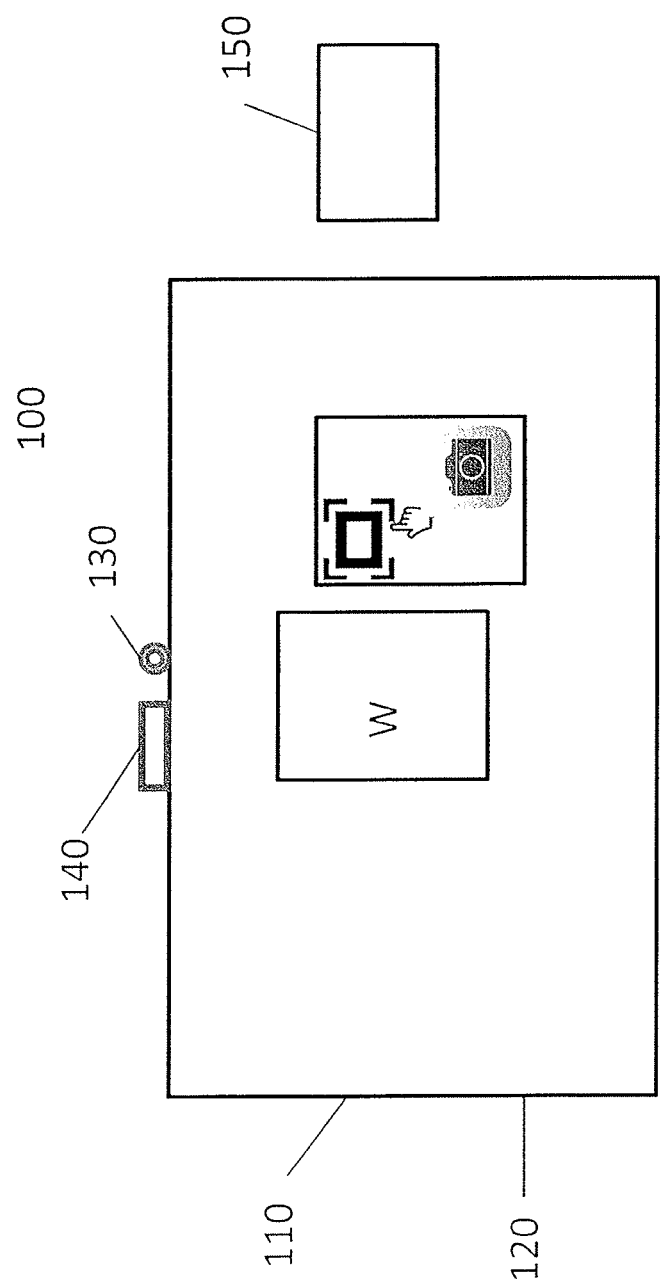
Figure 8:
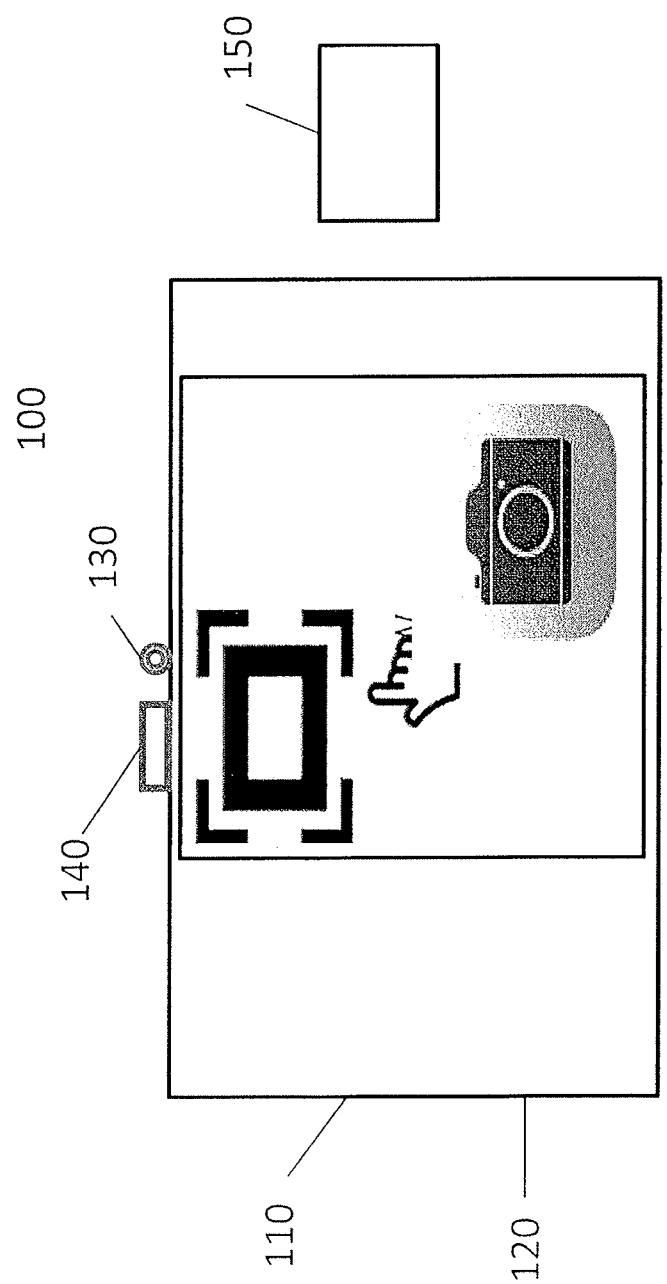

Once the hand cursor is moved over a window, as shown in FIG. 3, a first may be used to select and move the window, as shown in FIG. 5, the movement stopping when the first is opened. When an open hand of FIG. 2A remains on that window, this may then result in a grid of really big buttons, on a window, e.g., still image, x-ray, and so forth, that can be selected pops up, e.g., as shown in FIG. 6. Then, when the hand is closed on that menu item, e.g., expand to full screen as shown in FIG. 7 or take a snapshot of the window as shown in FIG. 8, that menu item is performed. when the closed hand is opened and closed again on the expand screen button on the expanded screen in FIG. 7, the window may return to its original size.

Figure 9:
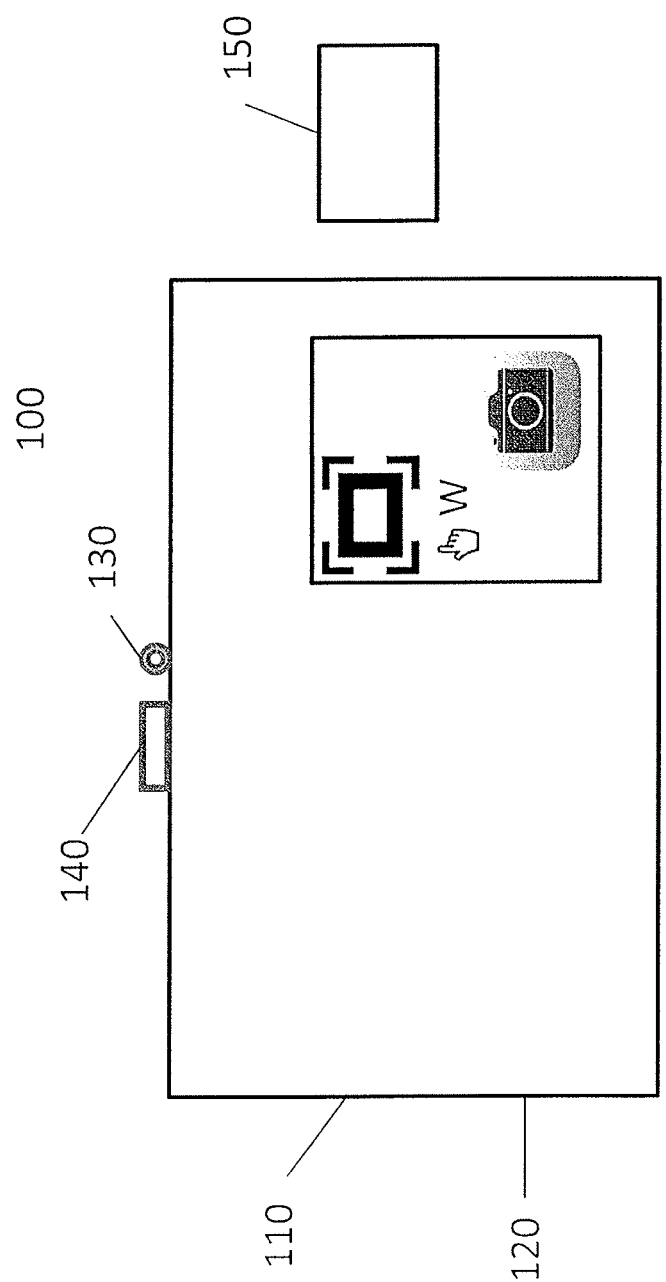

If a closed hand is on the window, but does not correspond to a button, the window may be moved as discussed above with respect to FIG. 4. Additionally, if the closed hand outside a button, but on the window, moves towards or away from the screen, the window may be zoomed in and out, respectively, as shown in FIG. 9.

Given the viewability and maneuverability constraints associated with remote gesture input, a number of actions that may be taken using remote gesture input may be a subset of those that can be performed with a mouse or touch inputs. For example, an open hand may move the window around the screen, while a closed hand, i.e., a fist, may select the window or button. A limited number of other gestures may be used to control the window.

Figure 11:
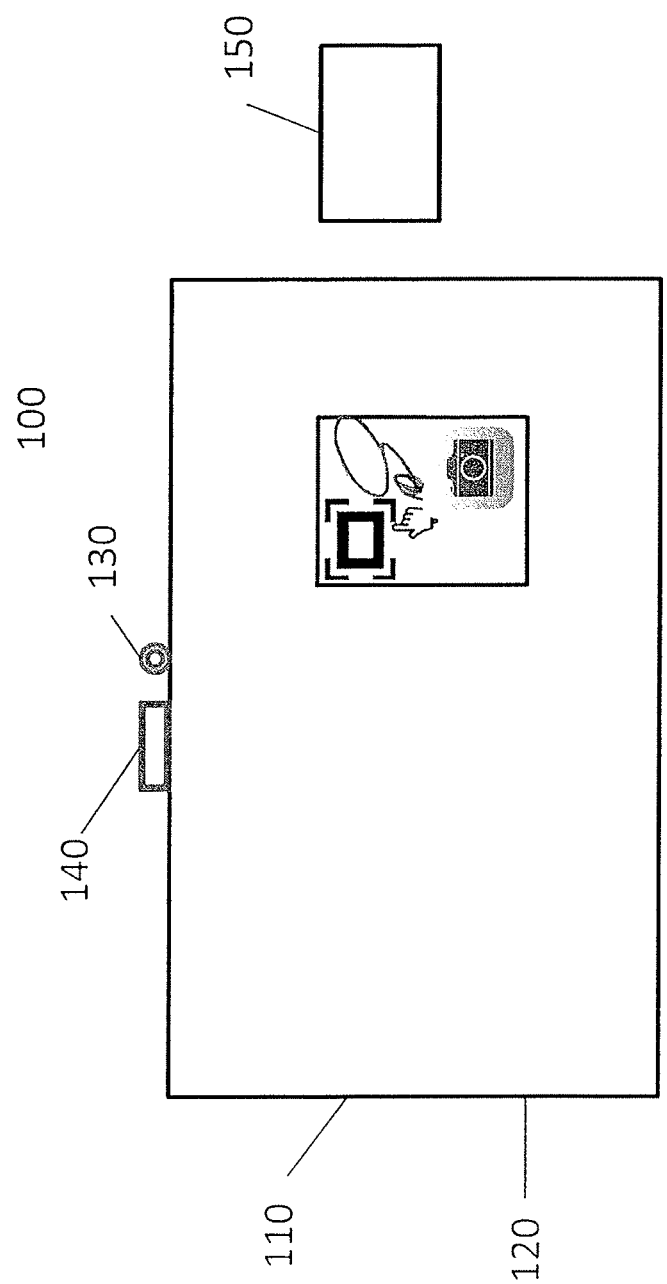
Figure 12:
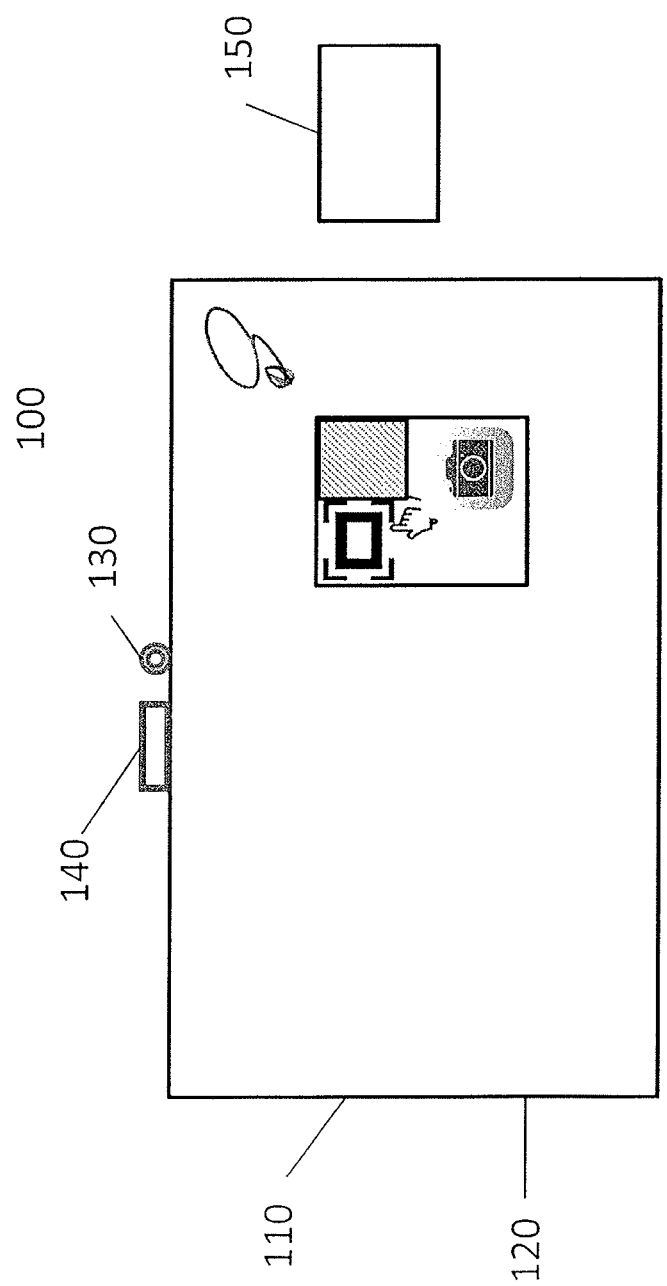

Further, other tools may be available on the display outside of the window to interface contactlessly with the window. For example, a lasso, an arrow, and so forth may be selected by a closed first and dragged to the window to select a portion within a window and when let go, e.g., by opening the closed hand, may leave the selected portion within the window highlighted, as may be seen in FIGS. 10 to 12. A one hand clap shown in FIG. 2C may be used to any actions taken.

Figure 13:
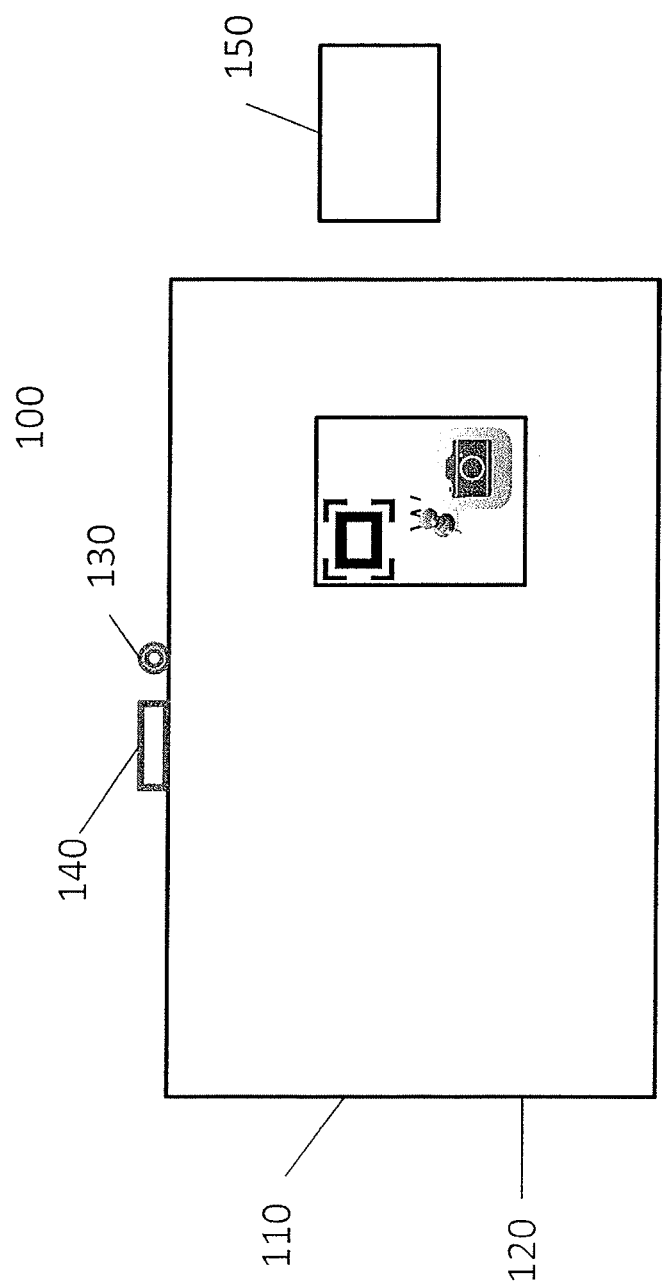

Additionally, as shown in FIG. 13, one of the buttons may change a mode of the input interface, e.g., such that the hand cursor is changed to a pin cursor, to allow more precise selection within the window.

Figure 14:
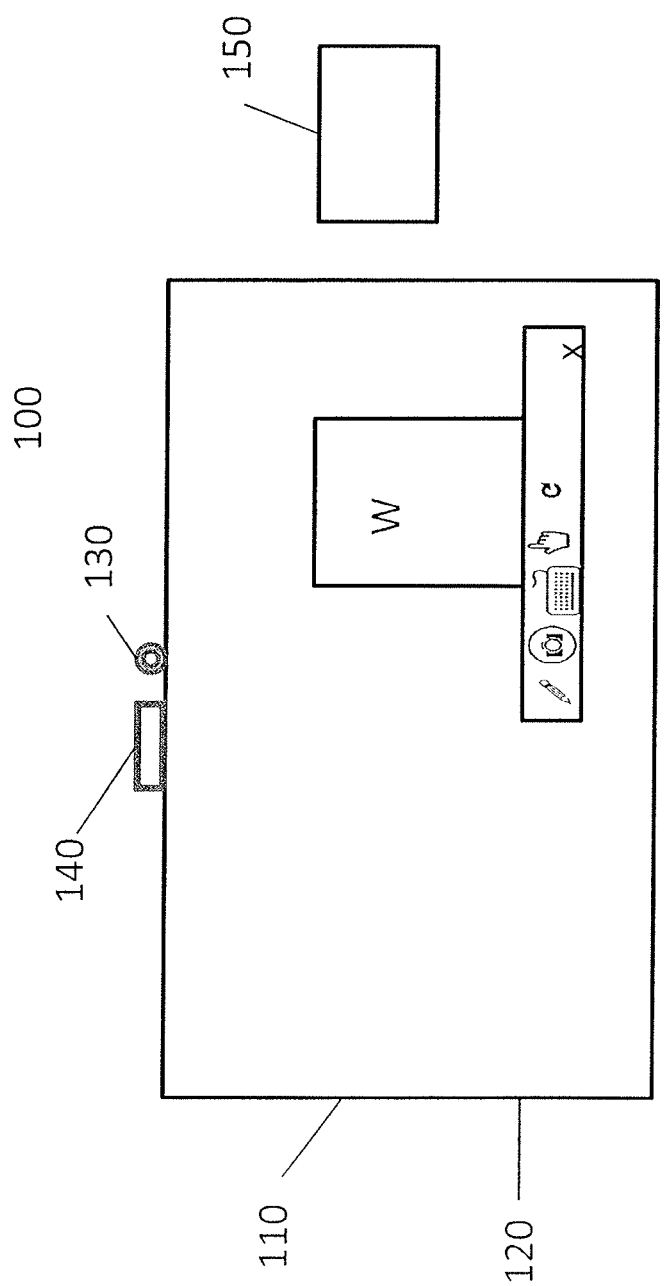
FIG. 14 illustrates a block diagram of an action in response to a touch input.
Figure 15:
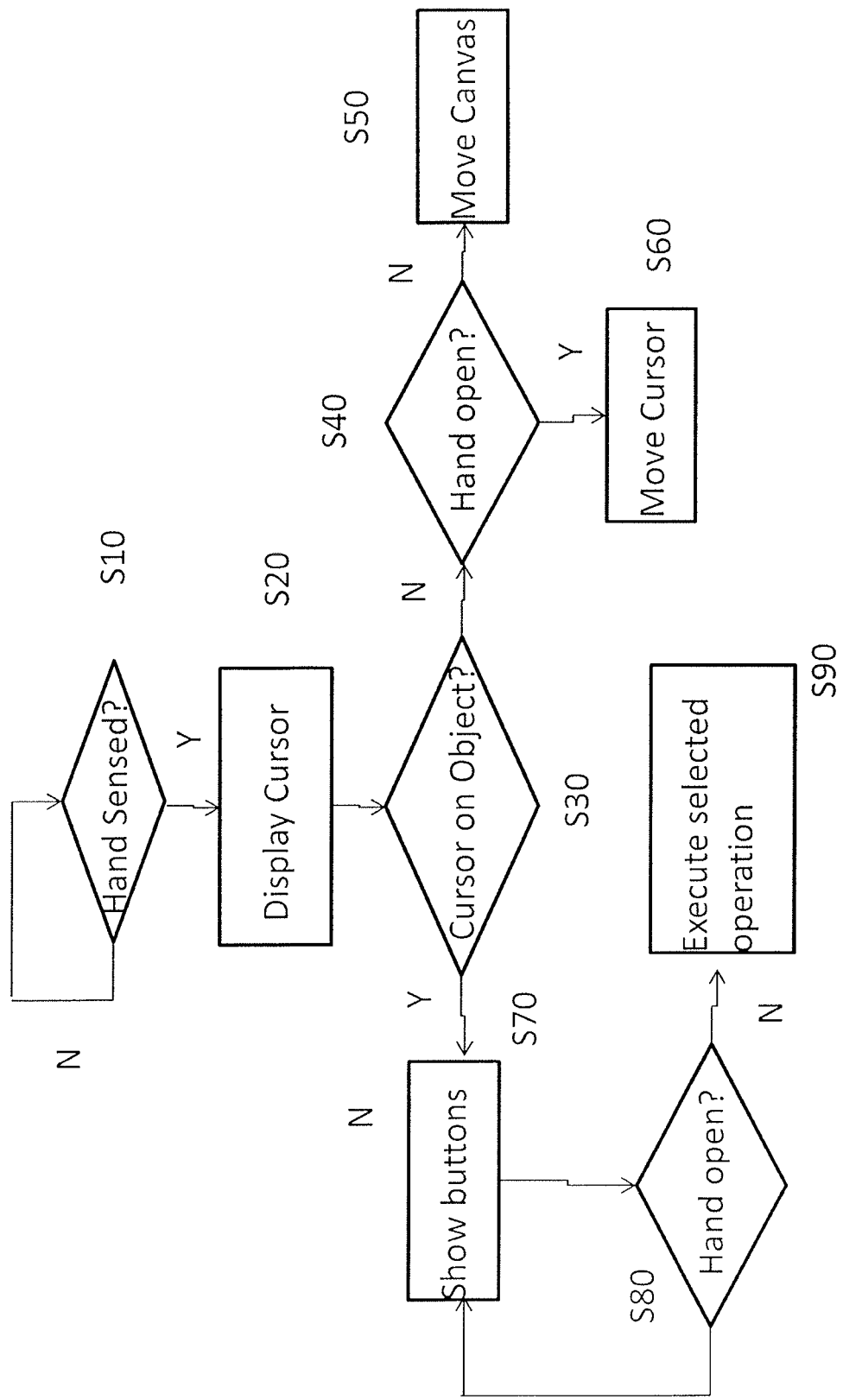
FIG. 15 illustrates a flowchart regarding actions taken in response to gestures sensed.

In contrast, as may be seen in FIG. 14, when the window is activated by a touch input, many more options may be available to manipulate the window, e.g., including a pen to annotate, a keyboard pop up, rotate, and so forth. In other words the input interface may be different for touch inputs than contactless inputs.

The above may be of particular interest when used in an environment in which physical interaction between the display and a user may be impractical, e.g., an operating room or other circumstances requiring a degree of sterility or other types of controlled environments. A user in the controlled environment may use gestures remotely to control the display in general, while a user outside the controlled environment may more finely control the display, i.e., has more options to manipulate windows.

Figure 10:
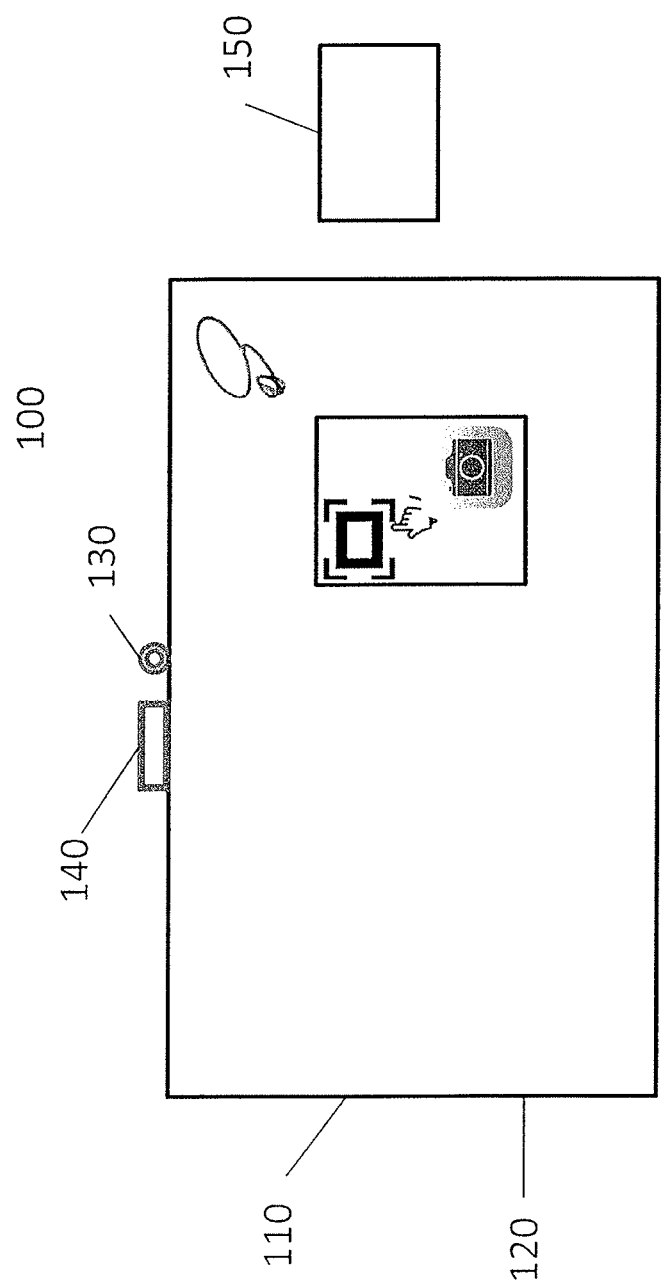

FIG. 10 illustrates a flowchart of actions taken in response to sensed gestures. In operation S10, the present of a hand is determined. When a hand is detected by the gesture sensor 140, in operation S20, a hand cursor is displayed on the display 110, e.g., near where the hand was sensed.

In operation S30, whether or not the cursor is on a window. If not, operation S40 determines if the hand is open. If not, moving the hand will move the cursor (compare FIGS. 1 and 3). If the hand is closed, moving the hand will move the entire canvas (compare FIGS. 1 and 4).

If operation S30 determines the cursor is on a window, operation S70 shows buttons of for the contactless gesture input interface. Then, when operation S80 determines the hand is closed, operation S90 executes the selected operation, e.g., either corresponding to the button or the default operations where there is no button.

The methods and processes described herein may be performed by code or instructions to be executed by a computer, processor, manager, or controller. Because the algorithms that form the basis of the methods (or operations of the computer, processor, or controller) are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. In a computing environment, a method of controlling contents displayed on a display, the method comprising:
    processing inputs from different users across multiple application windows of one or more applications displayed in a virtual canvas displayed on a display of a user interface, resulting in a multi-user graphical user interface (GUI);
    detecting touch inputs to the display from a first user;
    detecting contactless gestures remote from the display from a second user;
    in response to a touch input being detected, the GUI displaying a first input interface to be used with touch for the first user; and
    in response to a contactless gesture input being detected, the GUI displaying a second input interface to be used with gestures, the second input interface being different from the first input interface for the second user, wherein the first input interface and the second input interface are to be simultaneously displayed to simultaneously interact with any window of the multiple application windows displayed on the display and an entirety of the virtual canvas displayed on the display.

2. The method as claimed in claim 1, wherein the first input interface is in a periphery of a selected window and the second input interface overlaps a selected window.

3. The method as claimed in claim 2, wherein the second input interface includes at least two buttons.

4. The method as claimed in claim 3, wherein an area of the second input interface outside the at least two buttons has a default operation.

5. The method as claimed in claim 2, wherein the second input interface includes another input interface outside of the selected window.

6. The method as claimed in claim 2, wherein the second input interface includes a mode selection.

7. The method as claimed in claim 1, wherein the first input interface includes a first set of operations and the second input interface includes a second set of operations, different from the first set of operations.

8. The method as claimed in claim 7, wherein the second set of operations has fewer operations than the first set of operations.

9. The method as claimed in claim 8, wherein the second set of operations is a subset of the first set of operations.

10. The method as claimed in claim 7, wherein the second set of operations includes an operation not in the first set of operations.

11. The method as claimed in claim 1, wherein, in response to an open hand gesture is being detected, an icon is displayed on the display, and moving an open hand over the icon moves the icon on the display in accordance with the movement of the open hand and in response to a closed hand being detected over the icon, moving the virtual canvas on the display in accordance with the movement of the closed hand.

12. The method as claimed in claim 11, wherein, in response to a closed hand gesture being detected, a window overlapped by the closed hand is selected.

13. The method as claimed in claim 11, wherein, in response to an open hand gesture being detected on a window, buttons corresponding to the second input interface is displayed on the window overlapped by the open hand.

14. The method as claimed in claim 13, wherein, in response to a closed hand gesture being detected on a button, the operations of the second input interface that button corresponds to is executed.

15. The method as claimed in claim 1, wherein detecting the contactless gesture includes using a camera separate from a video-conferencing camera associated with the display.

16. The method as claimed in claim 1, wherein the OS is designed to run with a single user GUI.

17. The method as claimed in claim 1, further comprising simultaneously displaying the first input interface and the second input interface for a same window.

18. A system for interacting with a display, the system comprising:
    a computer in communication with the display, the computer configured to:
    control contents displayed on the display;
    process inputs from different users across multiple application windows of one or more applications in a virtual canvas displayed on the display,
    detect touch inputs on the display for a first user; and
    detect contactless gestures associated with the display remote from the display from a second user, wherein
    in response to a touch input being detected, control the display to display a first input interface to be used with touch for the first user; and
    in response to a contactless gesture input being detected, control the display to display a second input interface to be used with gestures, the second input interface being different from the first input interface, for the second user, wherein the first input interface and the second input interface are to be simultaneously displayed to simultaneously interact with any window of the multiple application windows displayed on the display and an entirety of the virtual canvas displayed on the display.

19. The system as claimed in claim 18, wherein the first input interface and the second input interface are simultaneously displayed for a same window.

20. A non-transitory computer readable storage including computer readable instructions that when executed by a computer cause the computer to execute a method of controlling contents displayed on a display, the method comprising:
 processing inputs from different users across multiple application windows of one or more applications in a virtual canvas displayed on a display;
 detecting touch inputs to the display from a first user;
 detecting contactless gestures remote from the display from a second user;
 in response to a touch input being detected, the GUI displaying a first input interface to be used with touch for the first user; and
 in response to a contactless gesture input being detected, the GUI displaying a second input interface to be used with gestures, the second input interface being different from the first input interface for the second user, wherein the first input interface and the second input interface are to be simultaneously displayed to simultaneously interact with any window of the multiple application windows displayed on the display and an entirety of the virtual canvas displayed on the display.

21. The non-transitory computer readable storage as claimed in claim 20, wherein the method further includes simultaneously displaying the first input interface and the second input interface for a same window.

\* \* \* \* \*